(No Model.)
J. P. BECKER.
SAFETY GAS COCK.
No. 412,066. Patented Oct. 1, 1889.
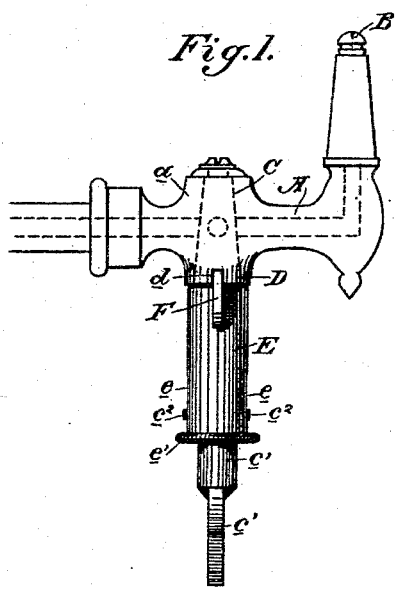
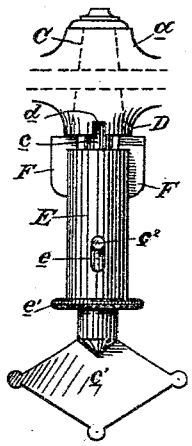
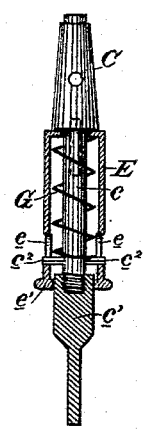
Witnesses,
Geo. E. Strong.
J. F. Kruse
Inventor,
Johannes P. Becker
By Dewey & Co.
attys

UNITED STATES PATENT OFFICE.

JOHANNES P. BECKER, OF SAN FRANCISCO, CALIFORNIA.

SAFETY GAS-COCK.

SPECIFICATION forming part of Letters Patent No. 412,066, dated October 1, 1889.

Application filed April 20, 1889. Serial No. 308,006. (No model.)

*To all whom it may concern:*

Be it known that I, JOHANNES PAUL BECKER, of the city and county of San Francisco, State of California, have invented an Improvement in Safety Gas-Cocks; and I hereby declare the following to be a full, clear, and exact description of the same.

My invention relates to that class of safety-cocks in which spring-controlled catches mounted upon the rotary valve-stem of the cock are adapted to engage with notches in a flange on the base of the valve-seat, whereby the valve is locked in closed position.

My invention consists in the hereinafter-described novel construction and arrangement of the locking-catches.

The object of my invention is to positively lock the gas-cock in a closed position, so as to prevent the escape of gas by the accidental turning of movement of the valve after it has been closed.

Referring to the accompanying drawings for a more complete explanation of my invention, Figure 1 is an elevation of my gas-cock, showing it closed and locked. Fig. 2 is an elevation showing it open. Fig. 3 is a detail section showing the arrangement of sleeve and spring on the valve-stem.

A is the pipe of the gas-cock, having a valve-seat $a$ and a burner B.

C is the valve, the stem $c$ of which extends downwardly and has the usual key $c'$ on its lower end. Around the base of the valve-seat $a$ is formed a flange D, in opposite sides of which are made the notches $d$. Fitted around the valve-stem is a sleeve E, which is connected with said stem by means of elongated slots $e$ in said sleeve fitted over and adapted to play up and down upon studs or pins $c^2$, projecting outwardly from the valve-stem $c$. Upon the lower end of the sleeve is a milled rim $e'$, whereby the sleeve may be readily turned by hand, and as said sleeve is secured by means of the pins to the valve-stem said stem is turned by the same movement which turns the sleeve. On the upper end of the sleeve are the catches F, consisting of two oppositely-located plates, and within the sleeve and around the valve-stem is properly seated a spiral spring G, the tendency of which is to hold said sleeve upwardly to its highest limit, in which position the ends of the catches come into contact with and travel on the lower edge of the notched flange. The sleeve is readily placed in position by making the key $c'$ screw upon the valve-stem, whereby it may be easily removed to permit the seating of the sleeve and then replaced.

The operation of the device is as follows: Supposing the cock to be open and it be desired to turn off the gas, the key $c'$ is grasped and turned so as to turn the valve stem and valve, and the sleeve turns with said valve. The catches F of the sleeve travel around on the lower edge of the flange D until, coming to the notches $d$ in said flange, they enter said notches, the spring of the sleeve throwing it and the catches upwardly, so that the latter enter and engage the notches, thereby positively locking the valve, so that it cannot be opened or closed, thus avoiding accidental displacement. To open the cock, the milled rim of the sleeve is seized, and said sleeve is drawn downwardly until the catch-plates come to a plane low enough to engage the lower edge of the flange. Then the sleeve is turned, and through it the valve, so that the catches play under the flange and hold said sleeve down.

I am aware that safety gas-burners have been made in which spring-controlled catches engage a notched rim on the burner-pipe, and I do not, therefore, claim such broadly; but What I do claim as new, and desire to secure by Letters Patent, is—

In a safety gas-burner, the pipe thereof having on its under side the notched flange and the valve seated in said pipe and having an outwardly-extending valve-stem, in combination with the sleeve fitted upon said valve-stem and secured thereto and movable thereon by means of elongated slots in said sleeve fitting over pins or studs in the valve-stem, catch-plates carried by the upper end of the sleeve and fitting against the flange and adapted to engage the notches thereof to lock the valve in a closed position, and the spring within the sleeve for holding it up and effecting the engagement of the catch-plates, substantially as described.

In witness whereof I have hereunto set my hand.

JOHANNES P. BECKER.

Witnesses:
S. H. NOURSE,
H. C. LEE.